United States Patent
Park et al.

(10) Patent No.: US 11,526,223 B2
(45) Date of Patent: *Dec. 13, 2022

(54) DISPLAY DEVICE INCLUDING TOUCH SENSOR AND TOUCH SENSING METHOD FOR THE SAME

(71) Applicant: LG Display Co., Ltd., Seoul (KR)

(72) Inventors: JaeKyu Park, Gympo-si (KR); HyunWoo Jang, Goyang-si (KR); HyeongWon Kang, Seoul (KR); SuWon Lee, Ansan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,182

(22) Filed: Apr. 16, 2021

(65) Prior Publication Data

US 2021/0232252 A1    Jul. 29, 2021

Related U.S. Application Data

(63) Continuation of application No. 16/843,252, filed on Apr. 8, 2020, now Pat. No. 11,009,985, which is a
(Continued)

(30) Foreign Application Priority Data

Oct. 25, 2016    (KR) .......................... 10-2016-0139568

(51) Int. Cl.
*G06F 3/041* (2006.01)
*G06F 3/044* (2006.01)
(Continued)

(52) U.S. Cl.
CPC ........ *G06F 3/0412* (2013.01); *G06F 3/03545* (2013.01); *G06F 3/047* (2013.01);
(Continued)

(58) Field of Classification Search
CPC ............... G06F 3/0412; G06F 3/03545; G06F 3/04162; G06F 3/04166; G06F 3/04184;
(Continued)

(56) References Cited

U.S. PATENT DOCUMENTS

2006/0178949 A1*  8/2006  McGrath ................ G06Q 30/02
                                                    705/26.1
2009/0115737 A1   5/2009  Toyoshima
(Continued)

FOREIGN PATENT DOCUMENTS

CN    101937662 A    1/2011
CN    104571745 A    4/2015
(Continued)

OTHER PUBLICATIONS

Chinese Office Action dated Dec. 15, 2020 issued in corresponding Patent Application No. 201710981355.7 (8 pages).
(Continued)

*Primary Examiner* — Thuy N Pardo
(74) *Attorney, Agent, or Firm* — Polsinelli PC

(57) ABSTRACT

A display device includes at least one touch sensor configured to sense a touch in response to a touch signal, a display panel including the at least one touch sensor and configured to operate in one of a display mode and a touch-sensing mode, a first circuit and a second circuit. The first circuit is configured to supply at least one of a first touch signal and a second touch signal to the at least one touch sensor during the touch-sensing mode, to yield at least one supplied signal, the first touch signal being different from the second touch signal. The second circuit is configured to control signal lines corresponding to the at least one touch sensor to receive a signal corresponding to the at least one supplied signal or to be in an electrically open state.

15 Claims, 17 Drawing Sheets

Related U.S. Application Data continuation of application No. 15/793,262, filed on Oct. 25, 2017, now Pat. No. 10,656,741.

(51) Int. Cl.
  *G06F 3/0354* (2013.01)
  *G06F 3/047* (2006.01)

(52) U.S. Cl.
  CPC .......... *G06F 3/0442* (2019.05); *G06F 3/0446* (2019.05); *G06F 3/04162* (2019.05); *G06F 3/04166* (2019.05); *G06F 3/04184* (2019.05)

(58) Field of Classification Search
  CPC ...... G06F 3/0442; G06F 3/0446; G06F 3/047; G06F 3/0416; G02F 1/13338
  USPC ................................. 345/156, 157, 173, 174
  See application file for complete search history.

(56) References Cited

U.S. PATENT DOCUMENTS

| | | |
|---|---|---|
| 2009/0207148 A1 | 8/2009 | Sugimoto et al. |
| 2012/0092296 A1 | 4/2012 | Yanase et al. |
| 2012/0200523 A1 | 8/2012 | Westhues |
| 2014/0168160 A1 | 6/2014 | Westhues |
| 2014/0176498 A1 | 6/2014 | Yanase et al. |
| 2014/0267150 A1 | 9/2014 | Masashi |
| 2014/0313138 A1 | 10/2014 | Jeong et al. |
| 2015/0009166 A1 | 1/2015 | Saitoh et al. |
| 2015/0035766 A1 | 2/2015 | Chung |
| 2015/0062062 A1* | 3/2015 | Han ...................... G06F 3/0446 345/174 |
| 2015/0103038 A1 | 4/2015 | Han et al. |
| 2015/0103039 A1* | 4/2015 | Cho .................... G06F 3/03545 345/174 |
| 2015/0161955 A1* | 6/2015 | Choi ...................... G06F 3/0446 345/174 |
| 2015/0185943 A1 | 7/2015 | Wen et al. |
| 2015/0242043 A1* | 8/2015 | Oda ....................... G06F 3/0446 345/174 |
| 2015/0277651 A1 | 10/2015 | Zhang et al. |
| 2015/0293592 A1 | 10/2015 | Cheong et al. |
| 2016/0034148 A1 | 2/2016 | Wilson et al. |
| 2016/0054846 A1 | 2/2016 | Lee |
| 2016/0139725 A1 | 5/2016 | Noguchi et al. |
| 2016/0178949 A1* | 6/2016 | Wang ................. G02F 1/134309 345/173 |
| 2016/0179134 A1 | 6/2016 | Ryu |
| 2016/0202779 A1 | 7/2016 | Jiang et al. |
| 2016/0232171 A1 | 8/2016 | Joseph et al. |
| 2016/0357321 A1 | 12/2016 | Ito et al. |
| 2017/0010739 A1 | 1/2017 | Ito et al. |
| 2017/0024070 A1 | 1/2017 | Moon et al. |
| 2017/0123640 A1 | 5/2017 | Wilson et al. |
| 2017/0131829 A1 | 5/2017 | Takahashi et al. |
| 2017/0329167 A1 | 11/2017 | Kim et al. |
| 2017/0336917 A1 | 11/2017 | Noguchi et al. |
| 2018/0307358 A1 | 10/2018 | Yamazaki et al. |
| 2019/0146629 A1 | 5/2019 | Moon et al. |

FOREIGN PATENT DOCUMENTS

| | | |
|---|---|---|
| CN | 104866148 A | 8/2015 |
| CN | 105786290 A | 7/2016 |
| CN | 106569627 A | 4/2017 |

OTHER PUBLICATIONS

Chinese Office Action dated Jun. 16, 2020 issued in corresponding Patent Application No. 201710981355.7 w/English Translation (28 pages).

* cited by examiner

DISPLAY DEVICE INCLUDING TOUCH SENSOR AND TOUCH SENSING METHOD FOR THE SAME

CROSS REFERENCE TO RELATED APPLICATIONS

This application is a continuation of U.S. patent application Ser. No. 16/843,252, filed Apr. 8, 2020, which is a continuation of U.S. patent application Ser. No. 15/793,262 filed on Oct. 25, 2017, now U.S. Pat. No. 10,656,741, which claims priority from Korean Patent Application No. 10-2016-0139568 filed on Oct. 25, 2016, which are hereby incorporated by reference in their entirety as if fully set forth herein.

BACKGROUND

Field of the Disclosure

The present disclosure relates to a display device including touch sensors and a touch sensing method for the same.

Background

In response to the development of the information society, demand for a variety of display devices for displaying images is increasing. In this regard, various types of display devices, such as active matrix liquid crystal display (LCD) devices and organic light-emitting diode (OLED) display devices, have come into widespread use.

In addition, display devices can operate in response to instructions input by users using a variety of input systems, such as a keyboard and a mouse. Touch panels allowing users to intuitively and conveniently input instructions to display devices by touching screens have been developed as input systems for display devices. A touch panel is disposed on the screen of a display device to receive an instruction input by a user when the user touches a specific point on the screen of the display device. However, the touch panel located on the display device may increase the thickness and weight of the display device and may decrease luminance, thereby degrading visibility. The trend towards slimmer and lighter profiles caused by the widespread distribution of mobile display devices, as well as in search of aesthetic appearance, has resulted in the development of in-cell display devices having touch sensors provided therein.

Display devices provide touch-based user interfaces enabling users to input data or instructions by touching screens using a body part, such as a finger, or a stylus. When a stylus is used, a user may hold or press against a display device with a hand. Since the area formed when a hand touches the screen, is significantly wider than an area formed when a stylus touches the screen, touching the screen with the stylus may not be sensed when the screen is touched with the hand.

Accordingly, there is a need for a solution that can discriminate (distinguish) a touch by a hand from a touch by a stylus in an in-cell display device.

SUMMARY

Various aspects of the present disclosure provide a display device including in-cell touch sensors that can discriminate (distinguish, separate, partition, etc.) a touch by a stylus from a touch by a finger and a touch sensing method for the display device.

Also provided are a display device including touch sensors that can recognize a touch by a stylus by minimizing the influence of a touch by a finger and a touch sensing method for the display device.

In one aspect of the present disclosure, a display device includes at least one touch sensor, a display panel including the at least one touch sensor and configured to display an image, a controller configured to control the display panel to operate in a display mode and a touch sensing mode, a first circuit and a second circuit. The first circuit is configured to supply a first touch signal to the at least one touch sensor during a first touch sensing period of the touch sensing mode, and supply a second touch signal to the at least one touch sensor during a second touch sensing period of the touch sensing mode, the second touch signal being different from the first touch signal. The second circuit is configured to control signal lines corresponding to the at least one touch sensor during the first touch sensing period, to receive a signal identical to the first touch signal or to be in an electrically open state, and control signal lines corresponding to the at least one touch sensor during the second touch sensing period, to receive a signal identical to the second touch signal or to be in an electrically open state.

In another aspect of the present disclosure, the signal lines include at least one data line and at least one gate line associated with the at least one touch sensor; and the second circuit includes a gate driving circuit and a data driving circuit.

In another aspect of the present disclosure, the gate driving circuit is configured to control the at least one gate line corresponding to the at least one touch sensor during the first touch sensing period, to receive the signal identical to the first touch signal or to be in the electrically open state, and the data driving circuit is configured to control the at least one data line corresponding to the at least one touch sensor during the first touch sensing period, to receive the signal identical to the first touch signal or to be in the electrically open state.

In another aspect of the present disclosure, the gate driving circuit is configured to control the at least one gate line corresponding to the at least one touch sensor during the second touch sensing period, to receive the signal identical to the second touch signal or to be in the electrically open state, and the data driving circuit is configured to control the at least one data line corresponding to the at least one touch sensor during the second touch sensing period, to receive the signal identical to the second touch signal or to be in the electrically open state.

In another aspect of the present disclosure, the at least one touch sensor is configured to receive a touch driving signal output from a stylus.

In another aspect of the present disclosure, the at least one touch sensor comprises a common electrode in the display panel.

In another aspect of the present disclosure, the controller is configured to operate the display panel in the display mode or the touch sensing mode based on a synchronization signal.

In another aspect of the present disclosure, the controller is configured to divide the display mode into a plurality of sub-display modes and the touch sensing mode into a plurality of sub-touch sensing modes, such that one sub-touch sensing mode among the plurality of sub-touch sensing modes is between two subsequent sub-display modes among the plurality of sub-display modes, and the first touch sensing period of the touch sensing mode corresponds to a first one of the sub-touch sensing modes and the second touch sensing period of the touch sensing mode corresponds to a second one of the sub-touch sensing modes.

In another aspect of the present disclosure, during the first touch sensing period, the first circuit is configured to sense a touch via a stylus in a first sub-portion of the display panel, and during the second touch sensing period, the first circuit is configured to sense a finger touch in a second sub-portion of the display panel.

In one aspect of the present disclosure, a display device includes at least one touch sensor configured to sense a touch in response to a touch signal, a display panel including the at least one touch sensor and configured to operate in one of a display mode and a touch-sensing mode, a first circuit and a second circuit. The first circuit is configured to supply at least one of a first touch signal and a second touch signal to the at least one touch sensor during the touch-sensing mode, to yield at least one supplied signal, the first touch signal being different from the second touch signal. The second circuit is configured to control signal lines corresponding to the at least one touch sensor to receive a signal corresponding to the at least one supplied signal or to be in an electrically open state.

In another aspect of the present disclosure, the first circuit is configured to supply the first touch signal to the at least one touch sensor during a first touch sensing period of the touch sensing mode, and supply the second touch signal to the at least one touch sensor during a second touch sensing period of the touch sensing mode.

In another aspect of the present disclosure, the second circuit is configured to control the signal lines corresponding to the at least one touch sensor during the first touch sensing period, to receive a signal identical to the first touch signal or to be in an electrically open state, and control the signal lines corresponding to the at least one touch sensor during the second touch sensing period, to receive a signal identical to the second touch signal or to be in an electrically open state.

In another aspect of the present disclosure, the at least one touch sensor is configured to receive a touch driving signal output from a stylus.

In another aspect of the present disclosure, the display panel operates in the display mode or the touch sensing mode based on a synchronization signal.

In another aspect of the present disclosure, the display mode includes a plurality of sub-display modes and the touch sensing mode includes a plurality of sub-touch sensing modes, such that one sub-touch sensing mode among the plurality of sub-touch sensing modes is between two subsequent sub-display modes among the plurality of sub-display modes, and the first touch sensing period of the touch sensing mode corresponds to a first one of the sub-touch sensing modes and the second touch sensing period of the touch sensing mode corresponds to a second one of the sub-touch sensing modes.

In one aspect of the present disclosure, a method includes operating a display panel including at least one touch sensor in one of a display mode and a touch sensing mode, supplying at least one of a first touch signal and a second touch signal to the at least one touch sensor during the touch sensing mode, to yield at least one supplied signal, the first touch signal being different from the second touch signal, and controlling signal lines corresponding to the at least one touch sensor to receive a signal corresponding to the at least one supplied signal or to be in an electrically open state.

In another aspect of the present disclosure, the operating operates the display panel in one of the display mode and the touch sensing mode based on a synchronization signal.

In another aspect of the present disclosure, the supplying supplies the first touch signal to the at least one touch sensor during a first touch sensing period of the touch sensing mode, and the supplying supplies the second touch signal to the at least one touch sensor during a second touch sensing period of the touch sensing mode.

In another aspect of the present disclosure, the controlling controls the signal lines corresponding to the at least one touch sensor during the first touch sensing period, to receive a signal identical to the first touch signal or to be in an electrically open state, and the controlling controls the signal lines corresponding to the at least one touch sensor during the second touch sensing period, to receive a signal identical to the second touch signal or to be in an electrically open state.

In another aspect of the present disclosure, the method further includes at least one of sensing a touch input via a stylus within a first sub-portion of the display panel during the touch sensing mode, and sensing a finger touch input within a second sub-portion of the display panel during the touch sensing mode.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Figure 1:
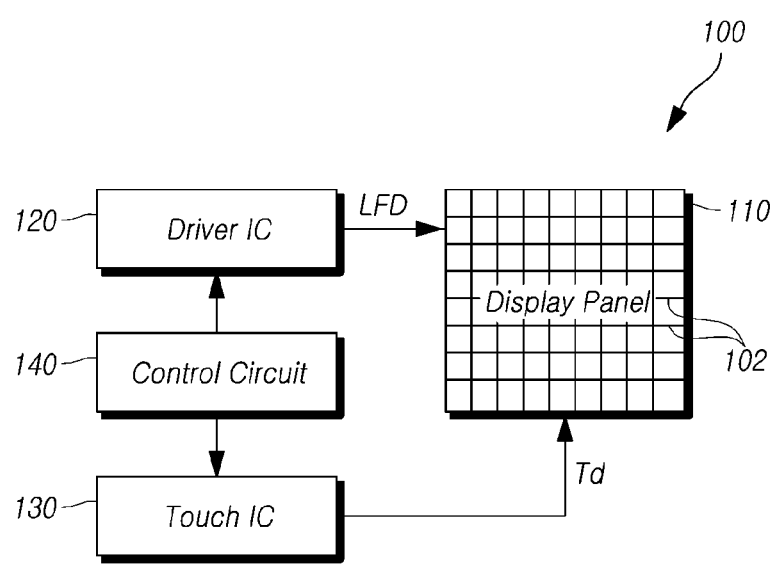
FIG. 1 illustrates the configuration of a display device according to an aspect of the present disclosure.

Hereinafter, the present disclosure will be described in detail with reference to the accompanying drawings. While specific implementations are discussed, it should be understood that this is done for illustration purposes only. A person skilled in the relevant art will recognize that other components and configurations may be used without parting from the spirit and scope of the disclosure.

Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative example mutually exclusive of other examples. Moreover, various features are described which may be exhibited by some examples and not by others. Similarly, various requirements are described which may be requirements for some examples but not other examples.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

It will also be understood that, while terms such as "first," "second," "A," "B," "(a)," and "(b)" may be used herein to describe various elements, such terms are only used to discriminate one element from another element. For example, a first element could be termed a second element, and similarly, a second element could be termed a first element, without departing from the scope of this disclosure. As used herein, the term "and/or," includes any and all combinations of one or more of the associated listed items.

The substance, sequence, order, or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

In the same context, it will be understood that when an element is referred to as being formed "on" or "under" another element, not only can it be directly formed on or under another element, but it can also be indirectly formed on or under another element via an intervening element. By contrast, when an element is referred to as being "directly on," or "directly under," to another element, there are no intervening elements present.

The terminology used herein is for the purpose of describing particular examples only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures and techniques may be shown without unnecessary detail in order to avoid obscuring example examples.

In the following description, illustrative examples will be described with reference to acts and symbolic representations of operations (e.g., in the form of flow charts, flow diagrams, data flow diagrams, structure diagrams, block diagrams, etc.) that may be implemented as program services or functional processes include routines, programs, objects, components, data structures, etc., that perform particular tasks or implement particular abstract data types and may be implemented using hardware at network elements. Non-limiting examples of such hardware may include one or more Central Processing Units (CPUs), digital signal processors (DSPs), application-specific-integrated-circuits, field programmable gate arrays (FPGAs), computers or the like.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks including functional blocks comprising devices, device components, steps or routines in a method embodied in software, or combinations of hardware and software.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

FIG. 1 illustrates a configuration of a display device according to an aspect of the present disclosure.

Referring to FIG. 1, the display device 100 includes a display panel 110, a driver IC 120, a touch integrated circuit (IC) 130 and a control circuit (controller) 140.

The display panel 110 is configured to display images, and has touch sensors 102 disposed therein (embedded therein). The touch sensors 102 may be a plurality of electrodes disposed within the display panel 110. The plurality of electrodes disposed within the display panel 110 may be arranged in intersecting directions (e.g., in a transverse direction and a longitudinal direction). However, the arrangement of the plurality of electrodes is not limited thereto. The touch sensors 102 may be common electrodes disposed within the display panel 110. The common electrodes are embodied as a plurality of electrode patterns able to sense a touch. When a user touches the display panel 110, the touch sensors 102 disposed therein can sense touch coordinates of a point touched by the user. When the user touches the display panel 110, the touch sensors 102 can sense touch coordinates based on a resultant change in capacitance. However, the present disclosure and a manner on which the touch sensors 102 can sense coordinates is not limited thereto. The touch sensors 102 can identify a user instruction by detecting touch coordinates of a touched point on the display panel 110.

The display panel 110 can operate to display images in a display mode (section) and sense touching pressure in a touch sensing mode (section). The display panel 110 can recognize touch coordinates in response to a touch in the touch sensing mode. Thus, the display panel 110 can display images by receiving data signals corresponding to the images and gate signals in the display mode while sensing touch coordinates of a touch in the touch sensing mode. When the touch sensors 102 are common electrodes, a common voltage for pixels may be applied to the touch sensors 102 in the display section, and a touch driving signal Td may be provided to the touch sensors 102 in the touch sensing section. The display panel 110 can operate in the display mode and the touch sensing mode. A single frame section of an image is divided into the display mode and the touch sensing mode. An image displayed in the display mode can also be maintained on the display panel 110 in the touch sensing mode.

The touch IC 130 senses touch coordinates by receiving a touch sensing signal, in response to a touch driving signal Td, in a touch sensing section. The touch IC 130 can control the touch driving signal Td to not be transferred to the touch sensors 102 in a first segment (first touch sensing period/first period) of the touch sensing section and control the touch driving signal Td to be transferred to the touch sensors 102 in a second segment (second touch sensing period/second period) of the touch sensing section. Alternatively, the touch IC 130 can output the touch driving signal Td to the touch sensors 102. The touch driving signal Td output by the touch IC 130 may be a direct current (DC) voltage having a desired (and/or alternatively, predetermined) level in the first period while being an alternating signal in the second period. The first period is a time period in which a touch by a stylus (not shown) is sensed, while the second period is a time period in which a touch by a finger is sensed. However, the present disclosure is not limited thereto. For example, a touch by a finger may be sensed in the first period, while a touch by a stylus may be sensed in the second period.

The touch IC 130 may operate by discriminating the display mode and the touch sensing mode (distinguishing/differentiating the display mode from the touch sensing mode). In the display mode, the touch driving signal Td is not transferred to the touch sensors 102 disposed within the display panel 110, since the touch sensors 102 are used as the common electrodes of the pixels in the display mode. In contrast, in the touch sensing mode, the touch driving signal Td can be transferred to the touch sensors 102. In addition, the touch IC 130 can transfer the touch driving signal as a DC voltage having a desired (and/or alternatively predetermined) level in the first period of the touch sensing mode while transferring the touch driving signal Td as an alternating signal in the second period of the touch sensing mode. Alternatively, the touch IC 130 may not transfer the touch driving signal in the first period while transferring the touch driving signal Td as an alternating signal in the second period.

In addition, the touch IC 130 can sense touch coordinates of a point touched by a stylus, based on an alternating signal provided by the stylus in the first period. When the stylus touches the display panel 110, the alternating signal provided by the stylus changes an amount of capacitance stored in a corresponding touch electrode disposed within the display panel 110, so that the touch coordinates touched by the stylus can be sensed based on the change in capacitance. Even in the case that the display panel 110 is simultaneously touched by the stylus and a hand in the first period, the driving signal Td is not transferred to the touch sensor 102 or is transferred as a DC voltage having a desired (and/or alternatively predetermined) level to the touch sensor 102. When the display panel 110 is touched by the hand, a change in capacitance caused thereby is insignificant. Thus, the influence of the touch by the hand on the touch by the stylus can be reduced. Then, the touch sensor 102 can sense the touch by the stylus. In the second period, the touch IC 130 transfers the touch driving signal Td to the touch sensor 102 as an alternating signal. When the display panel 110 is touched by the hand, a change in capacitance occurs, so that the touch sensor 102 can sense the touch by the hand. Thus, the touch by the hand in the second period can be sensed even when the stylus is used. Even in the case that separate mode switching is not performed the touch by the hand can be discriminated from the touch by the stylus.

Signal lines (not shown) included in the display panel 110 may be coupled to the touch sensors 102, thereby changing the touch driving signal Td, so that a touch cannot be sensed. To overcome the coupling problem, the driver IC 120 outputs a load free driving signal LFD that is synchronous with the touch driving signal Td.

The display device 100 further includes a control circuit 140. The control circuit 140 can control the display panel 110 to operate in a responsive manner in the display mode and the touch sensing mode. The control circuit 140 can control the touch IC 130 and the driver IC 120. The control circuit 140 can control the touch IC 130 not to output the touch driving signal Td and control the driver IC 120 to output data voltages (or signals) and gate signals corresponding to data signals. The control circuit 140 can control the touch driving mode to be divided into the first period and the second period. Then, in the first period, the touch IC 130 is controlled not to output the touch driving signal Td or is controlled to output the touch driving signal Td as a DC voltage having a desired (and/or alternatively predetermined) level. In the second period, the touch driving signal Td is output as an alternating signal. In addition, the control circuit 140 can control the driver IC 120 to output the load free driving signal LFD that is synchronous with the touch driving signal Td, so that the load free driving signal LFD can be output as a DC voltage having a desired (and/or alternatively predetermined) voltage level in the first period and as an alternating signal in the second period.

Figure 2A:
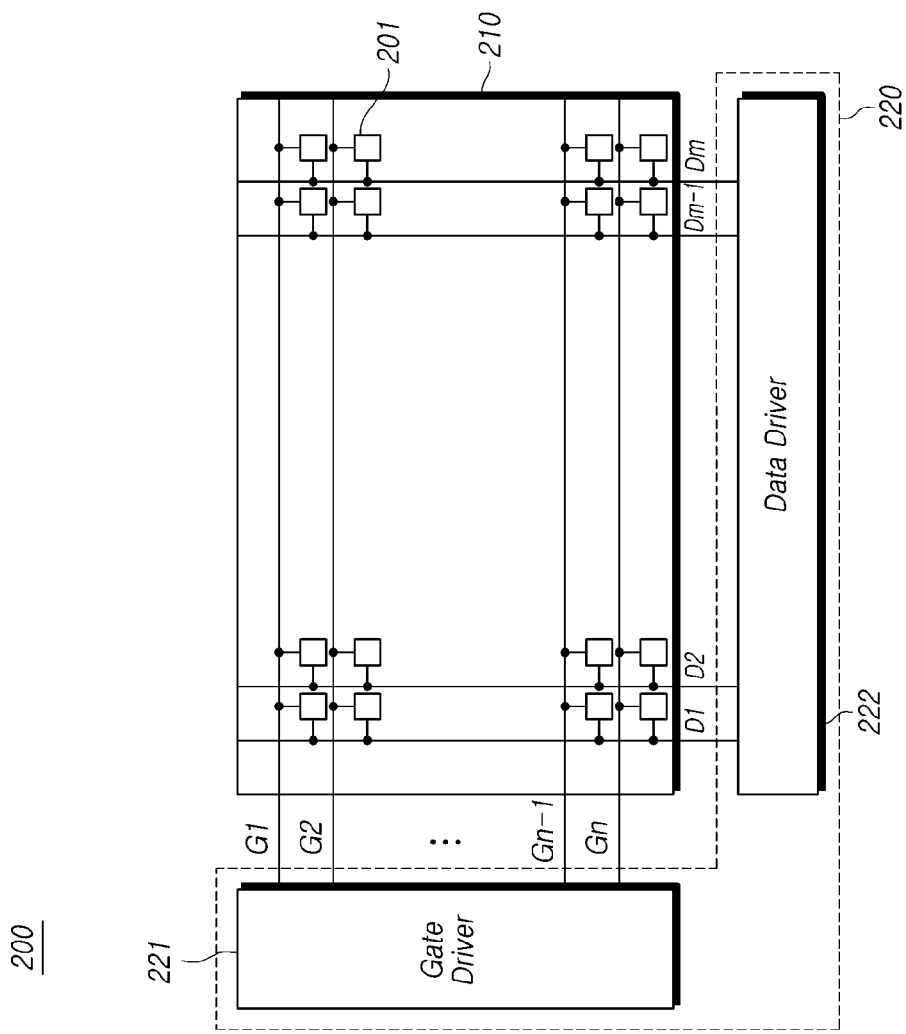
FIG. 2A illustrates the structure of the display panel and the driver IC illustrated in FIG. 1, according to an aspect of the present disclosure.

FIG. 2A illustrates the structure of the display panel and the driver IC illustrated in FIG. 1, according to an aspect of the present disclosure.

Referring to FIG. 2A, the display panel 110 includes a plurality of gate lines G1, G2, . . . , Gn−1, and Gn and a plurality of data lines D1, D2, . . . , Dm−1, and Dm intersecting the plurality of gate lines G1, G2, . . . , Gn−1, and Gn. A number of pixels, such as pixel 201, are provided in regions in which the plurality of data lines D1, D2, . . . , Dm−1, and Dm intersect the plurality of gate lines G1, G2, . . . , Gn−1, and Gn. The driver IC 220 includes a gate driver 221 and a data driver 222. The gate driver 221 is connected to the plurality of gate lines G1, G2, . . . , Gn−1, and Gn to sequentially transfer a gate signal to the plurality of gate lines G1, G2, . . . , Gn−1, and Gn. The data driver 222 is connected to the plurality of data lines D1, D2, . . . , Dm−1, and Dm to transfer data voltages corresponding to data signals to the plurality of data lines D1, D2, . . . , Dm−1, and Dm.

In addition, the plurality of data lines D1, D2, . . . , Dm−1, and Dm and the plurality of gate lines G1, G2, . . . , Gn−1, and Gn may be coupled to the touch sensors 102, as illustrated in FIG. 1, to which a touch driving signal Td is transferred. When electrical coupling is formed between the touch sensors 102 and the plurality of data lines D1, D2, . . . , Dm−1, and Dm and/or between the touch sensors 102 and the plurality of gate lines G1, G2, . . . , Gn−1, and Gn, a touch driving signal Td to be transferred to the touch sensors 102 may be distorted, so that touch sensing cannot be performed accurately. To solve this problem, a load free driving signal, in synchronization with the touch driving signal, can be output to the plurality of data lines D1, D2, . . . , Dm−1, and Dm and/or the plurality of gate lines G1, G2, . . . , Gn−1, and Gn, thereby preventing the touch sensors 102 from being coupled to the plurality of data lines D1, D2, . . . , Dm−1, and Dm and/or the plurality of gate lines G1, G2, . . . , Gn−1, and Gn. This can consequently prevent the voltage of the touch driving signal from changing. The term "synchronization" used herein may mean that the signals have the same phase and frequency. In addition, the term "being the same" used herein may not only mean "being completely the same" but also include "substantially similar with minor differences."

Although the driver IC 220 is illustrated as including the gate driver 221, the present disclosure is not limited thereto. The gate driver 221 may be embodied as a gate-in-panel (GIP) circuit disposed on a side of the display panel 210.

Figure 2B:
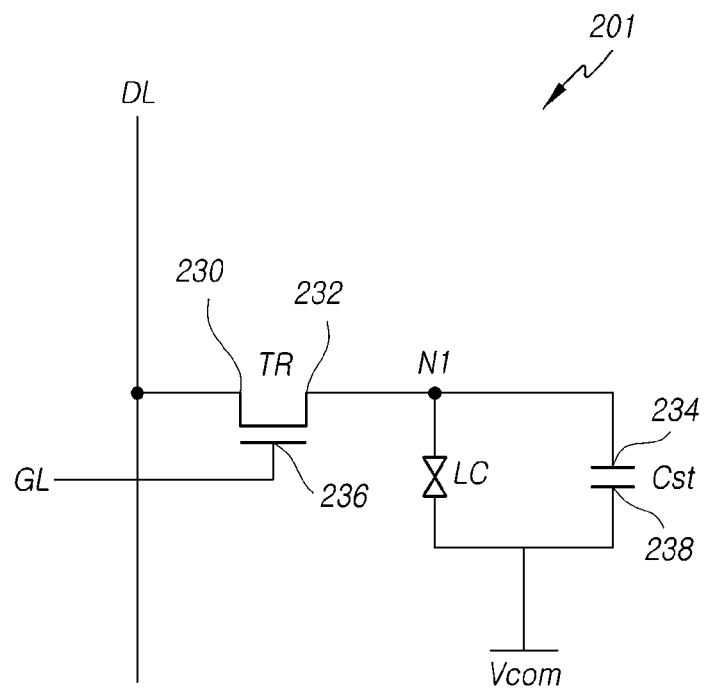
FIG. 2B is a circuit diagram illustrating the pixel included in the display panel illustrated in FIG. 2A, according to an aspect of the present disclosure.

FIG. 2B is a circuit diagram illustrating the pixel included in the display panel illustrated in FIG. 2A, according to an aspect of the present disclosure.

Referring to FIG. 2B, a pixel 201 includes a switching transistor TR, a storage capacitor Cst, and a liquid crystal cell LC. One end 230 of the switching transistor TR is connected to a data line DL, and the other end 232 of the switching transistor TR is connected to a first electrode 234 of the storage capacitor Cst. A gate 236 of the switching transistor TR is connected to a gate line GL. A second electrode 238 of the storage capacitor Cst and the liquid crystal cell LC are connected to a common electrode Vcom. The common electrode Vcom can act as a touch sensor.

In the pixel 201 having the above-described structure, a common voltage is transferred to the common electrode Vcom, and the switching transistor TR can be turned on by a gate signal transferred through the gate line GL in a display mode. When the switching transistor TR is turned on, a data signal corresponding to a data voltage flowing through the data line DL is transferred to the first electrode 234 of the storage capacitor Cst and the liquid crystal cell LC. In a touch sensing mode, the switching transistor TR is turned off by a gate signal to stop the transfer of a data signal through the data line DL to the storage capacitor Cst and the liquid crystal cell LC. However, the storage capacitor Cst maintains the data voltage corresponding to the data signal, so that the data voltage corresponding to the data signal can be maintained in the liquid crystal cell LC even in the touch sensing mode.

In addition, a touch driving signal Td can alternately be transferred to the common electrode Vcom in a second period of the touch sensing mode. In addition, a load free driving signal LFD can be transferred to at least one of the data line DL and the gate line GL. This can prevent the touch driving signal Td from being changed by coupling between the common electrode Vcom to which the touch driving signal is transferred and the data line DL and/or between the common electrode Vcom and the gate line GL.

Figure 3:
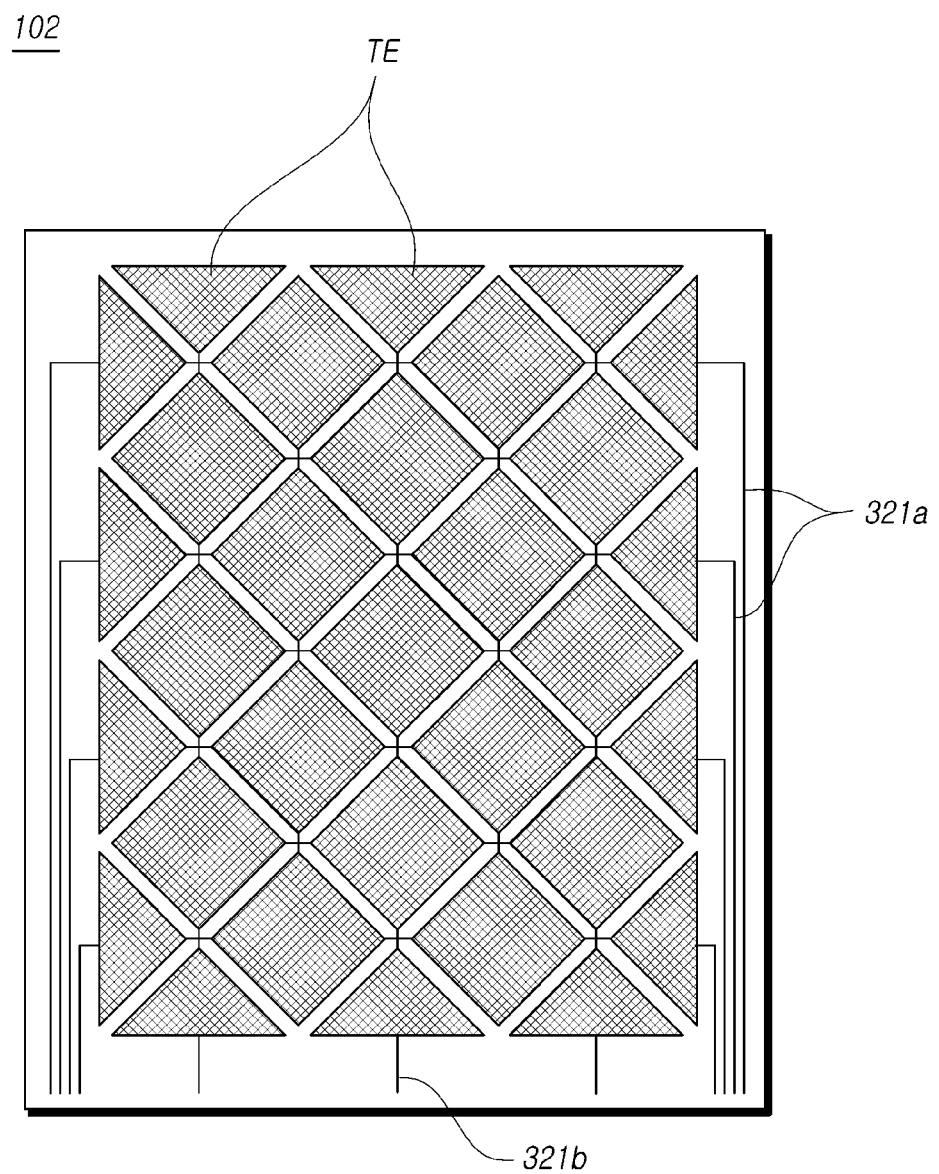
FIG. 3 is a top plan view illustrating the touch sensor included in the display device illustrated in FIG. 1, according to an aspect of the present disclosure.

FIG. 3 is a top plan view illustrating the touch sensor included in the display device illustrated in FIG. 1, according to an aspect of the present disclosure.

Referring to FIG. 3, a plurality of touch electrodes TE of the touch sensor 102 are made by patterning a conductive metal layer. Each of the plurality of touch electrodes TE may be made of any known or to be developed transparent material, including but not limited to indium tin oxide (ITO). In addition, each of the plurality of patterned touch electrodes TE may have mesh-shaped openings. Thus, light can exit through the openings or through ITO electrodes. The patterns of the plurality of touch electrodes TE imparting mesh shapes to the openings may be referred to as touch electrode lines, while driving lines 321a, through which touch driving signals for driving the touch electrodes TE are provided to the touch electrodes TE, and sensing lines 321b, through which a touch sensing signal generated in response to a touch sensed by the touch electrodes TE is transferred, may be referred to as touch lines. In addition, color filters may be disposed on the openings.

The driving lines 321a are connected to rows of electrodes of the plurality of touch electrodes TE, which are connected in a row direction, to sequentially transfer the touch driving signal Td. The sensing lines 321b are connected to columns of electrodes TE, which are connected in a column direction, to transfer touch sensing signals generated by the touch electrodes TE.

Figure 4:
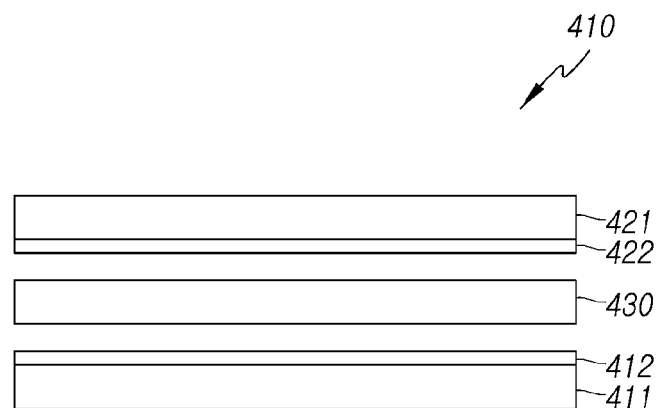
FIG. 4 is a cross-sectional view illustrating touch sensors provided within the display panel illustrated in FIG. 1, according to an aspect of the present disclosure.

FIG. 4 is a cross-sectional view illustrating touch sensors provided within the display panel illustrated in FIG. 1, according to an aspect of the present disclosure.

Referring to FIG. 4, the display panel 410 includes a first substrate 411 and a second substrate 421 facing the first substrate 411. A liquid crystal layer 430 is disposed between the first substrate 411 and the second substrate 421. A circuit 412 is provided on top of the first substrate 411. The switching transistor TR and the first electrode 234 of the storage capacitor Cst of the pixel 201, as illustrated in FIG. 2B, are provided in the circuit 412. The data lines DL and the gate lines GL, as illustrated in FIG. 2B, are disposed in the circuit 412. Although the circuit 412 is illustrated as being disposed on top of the first substrate 411, the present disclosure is not limited thereto. Alternatively, the first substrate 411 may include the circuit 412.

A patterned common electrode 422 is provided in the second substrate 421. A color filter (not shown) may be disposed on the portion in which the common electrode 422 is patterned, but the present disclosure is not limited thereto. The patterned common electrode 422 in the second substrate 421 may be embodied as the touch sensors 102 illustrated in FIG. 1. Accordingly, the touch sensors are disposed within the display panel 110, thereby reducing the thickness of the display panel.

The liquid crystal layer 430 disposed between the first substrate 411 and the second substrate 421 is configured such that the orientation of liquid crystal molecules therein is determined depending on a voltage applied between the first substrate 411 and the second substrate 421. Depending on the orientation thereof, the liquid crystal molecules allow light to pass through or block light so that an image is displayed.

Figure 5:
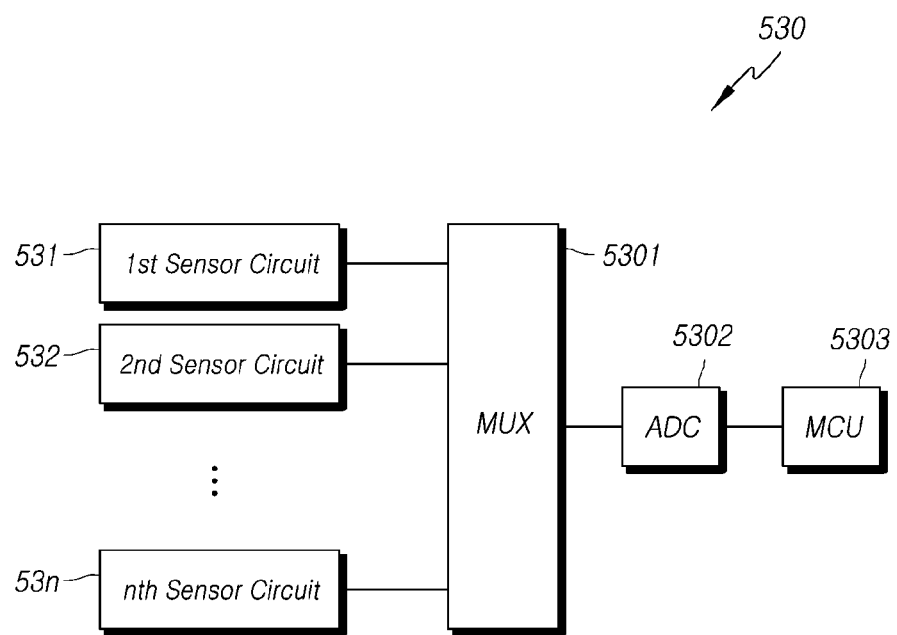
FIG. 5 illustrates the structure of the touch IC illustrated in FIG. 1, according to an aspect of the present disclosure.

FIG. 5 illustrates the structure of the touch IC illustrated in FIG. 1, according to an aspect of the present disclosure.

Referring to FIG. 5, a touch IC 530 includes: a plurality of touch sensor circuits 531, 532, . . . , and 53n connected to the touch sensors 102 disposed within the display panel 110 illustrated in FIG. 1; a multiplexer (or MUX) 5301 connected to the plurality of touch sensor circuits 531, 532, . . . , and 53n to output a plurality of signals generated by the plurality of touch sensor circuits 531, 532, . . . , and 53n through a single output terminal; and an analog-to-digital converter (ADC) 5302 converting the signals output by the multiplexer 5301 as digital signals. The touch IC 530 further includes a micro control unit 5303 that calculates (determines) touch coordinates based on the digital signals output by the analog-to-digital converter 5302 and controlling a touch driving signal provided to the display panel 110. The multiplexer 5301 makes it possible to reduce the number of terminals, through which sensing signals are output to the analog-to-digital converter 5302 by the plurality of touch sensor circuits 531, 532, . . . , and 53n. The multiplexer 5301 can control signals provided to the touch sensor circuits 531, 532, . . . , and 53n and the touch sensors 102.

Figure 6:
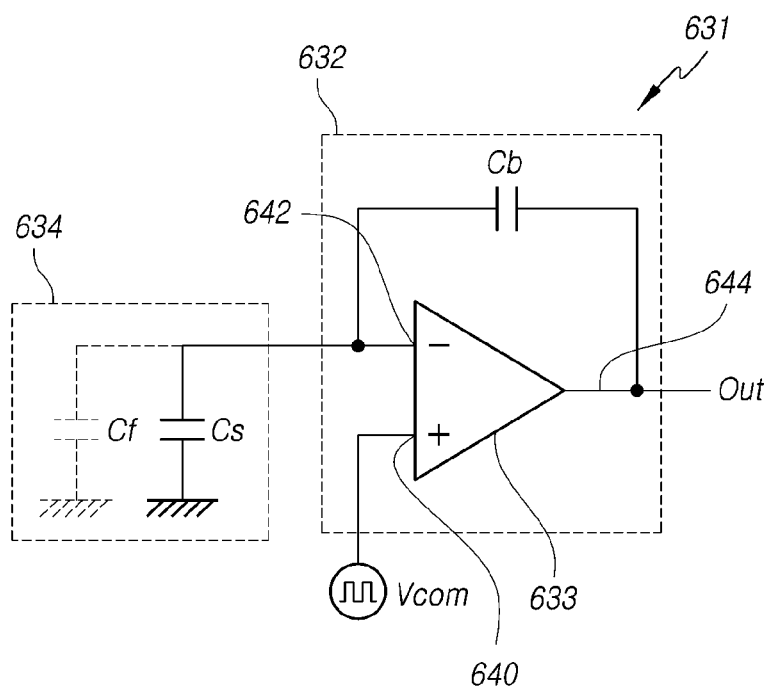
FIG. 6 is a circuit diagram illustrating the touch sensor circuit illustrated in FIG. 5, according to an aspect of the present disclosure.

FIG. 6 is a circuit diagram illustrating the touch sensor circuit illustrated in FIG. 5, according to an aspect of the present disclosure.

Referring to FIG. 6, a touch sensor circuit 631 (which may be the same as any of the touch sensor circuits 531, 532, . . . , and 53n shown in FIG. 5) includes an integrator 632. A touch sensor 634 is connected to the integrator 632. The touch sensor 634 has a first capacitor Cs formed by a corresponding touch sensor among the plurality of touch sensors 102 in the display panel 110, illustrated in FIG. 1, and a second capacitor Cf formed by a touch by a finger. The second capacitor Cf may not be formed when the finger does not touch the display panel.

The integrator 632 includes an amplifier 633 and an integration capacitor Cb. The amplifier 633 has a positive (+) input terminal 640, to which a common electrode Vcom is connected, and a negative (−) input terminal 642, to which the touch sensor 634 is connected. The integration capacitor Cb is connected to an output terminal 644 and the negative input terminal 642 of the amplifier 633. A DC voltage having a desired (and/or alternatively predetermined) level is applied to the common electrode Vcom in a first period (described above), in which a touch by a stylus is sensed, and an alternating signal is applied to the common electrode Vcom in a second period (described above), in which a touch by a finger is sensed.

Figure 7:
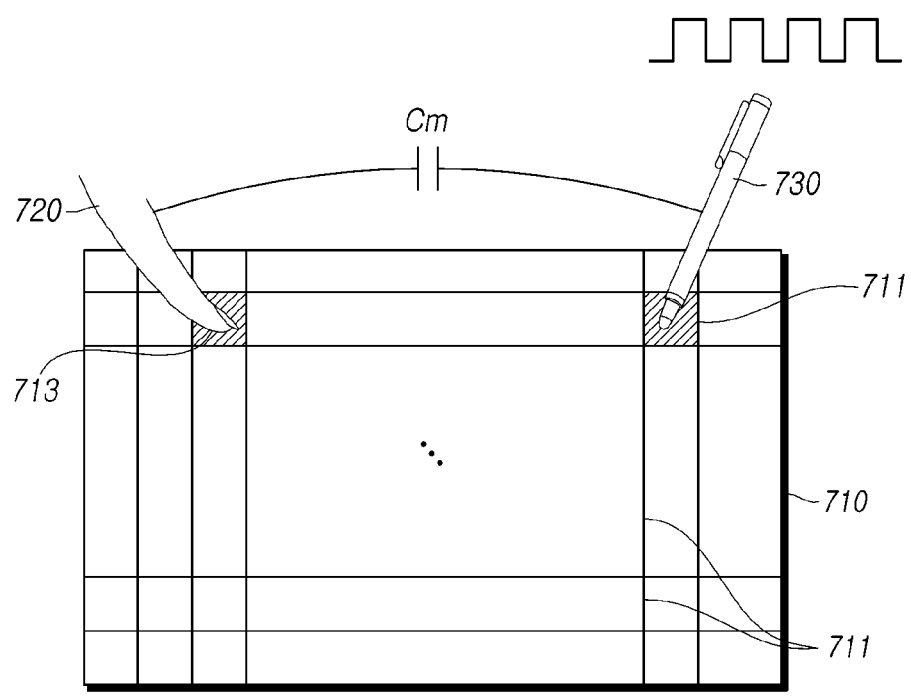
FIG. 7 illustrates the relationship between a touch by a finger and a touch by a stylus, according to an aspect of the present disclosure.

FIG. 7 illustrates the relationship between a touch by a finger and a touch by a stylus, according to an aspect of the present disclosure.

Referring to FIG. 7, when one point on a display panel 710 is touched using a finger 720 and the other point on the display panel 710 is touched using a stylus 730, the finger 720 and the stylus 730 may be coupled (forming the capacitance Cm shown in FIG. 7). Since the area with which the finger 720 touches the screen is different from the area with which the stylus 730 touches the screen, touching the screen with the stylus 730 may not be sensed when the screen is touched with the finger 720.

To solve this problem, in the first period, a touch driving signal Td is not provided to the touch sensor 711 of the display panel 710 but a touch driving signal or an alternating signal corresponding to the touch driving signal is caused by the stylus 730. Thus, the touch by the stylus 730 may cause a change in capacitance in the touch sensor 711. In addition, since the finger 720 is coupled to the stylus 730, the alternating signal of the stylus 730 is transferred to the finger 720, so that a change in capacitance may occur at a point 713 on the display panel 710 touched by the finger 720. In this case, the touch by the stylus can be recognized, since the change in capacitance caused by the finger 720 touching the display panel 710, is insignificant relative to the change in capacitance in the touch sensor 711 caused by the stylus 730 touching the display panel 710.

In addition, in the second period, when both the touch by the finger 720 and the touch by the stylus 730 are made, the touch by the stylus 730 may not be recognized due to the touch by the finger 720. However, in the first period, the touch by the stylus 730 can be recognized. Thus, the touch by the finger 720 and the touch by the stylus 730 can be discriminated from each other.

When the user does not use the stylus 730, the touch driving signal Td is not transferred to the touch sensor 711 in the first period. Then, a change in capacitance does not occur, even in the case that the user touches the display panel 710 using the finger 720. However, in the second period, the touch by the finger of the user is recognizable, since the touch driving signal Td is provided to the touch sensor 711. Thus, the user can cause both the touch by the finger 720 and the touch by the stylus 730 to be recognized without setting the mode.

In one example, during the touch sensing mode (or in the touch sensing section as it may alternatively be referred to herein), the touch IC 130 can sense a touch in one or more portions (sub-portions) of the display panel 110. For example, during a first touch sensing period of the touch sensing mode, the touch IC 130 can sense a touch by a stylus in a first portion of the display panel 110 (e.g., upper right corner of the display panel 110) while in the second touch sensing period of the touch sensing mode, the touch IC 130 can sense a touch by a finger in a second portion of the display panel 110 (e.g., upper left corner of the display panel 110).

Figure 8:
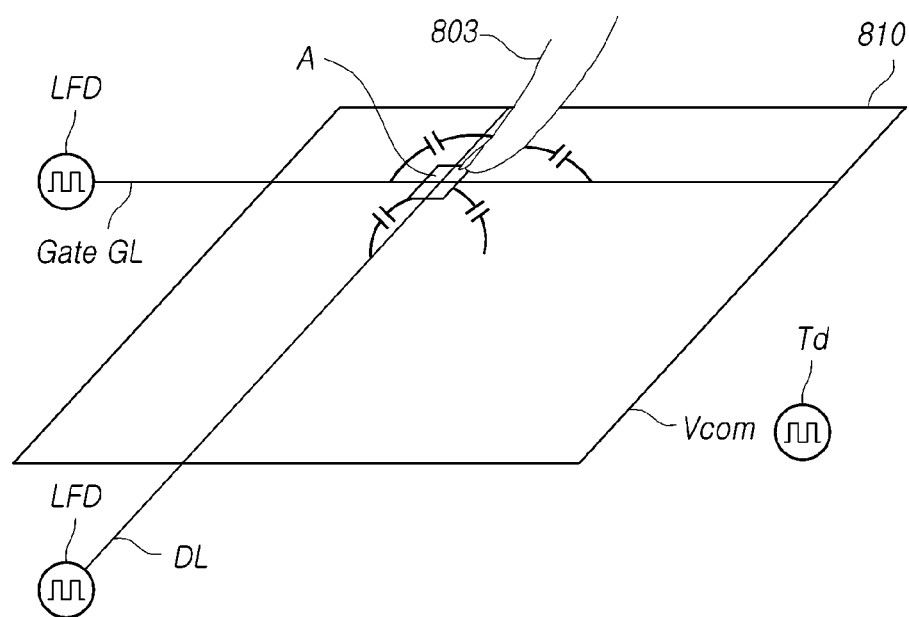
FIG. 8 illustrates a method of sensing a touch in the display panel, according to an aspect of the present disclosure.

FIG. 8 illustrates a method of sensing a touch in the display panel, according to an aspect of the present disclosure.

Referring to FIG. 8, a touch driving signal Td is transferred to a common electrode Vcom, and a load free driving signal LFD is transferred to at least one of a gate line GL and a data line DL. The touch driving signal Td may be an alternating signal, while the load free driving signal may be a signal in synchronization with the touch driving signal. In this state, when a point A on a display panel 810 is touched by a finger 803, parasitic capacitance is formed between the common electrode Vcom and the data line DL, between the common electrode Vcom and the gate line GL, and the common electrode Vcom and the finger 803. Then, the common electrode Vcom can output a touch sensing signal by sensing a change in capacitance based on such parasitic capacitance. Since the touch driving signal Td is synchronous with the load free driving signal LFD, the touch sensing signal is not influenced by parasitic capacitance formed between the common electrode Vcom and the gate line GL and between the common electrode Vcom and the data line DL. Thus, the touch sensing signal can respond to a change in capacitance caused by the touch by the finger 803.

Figure 9:
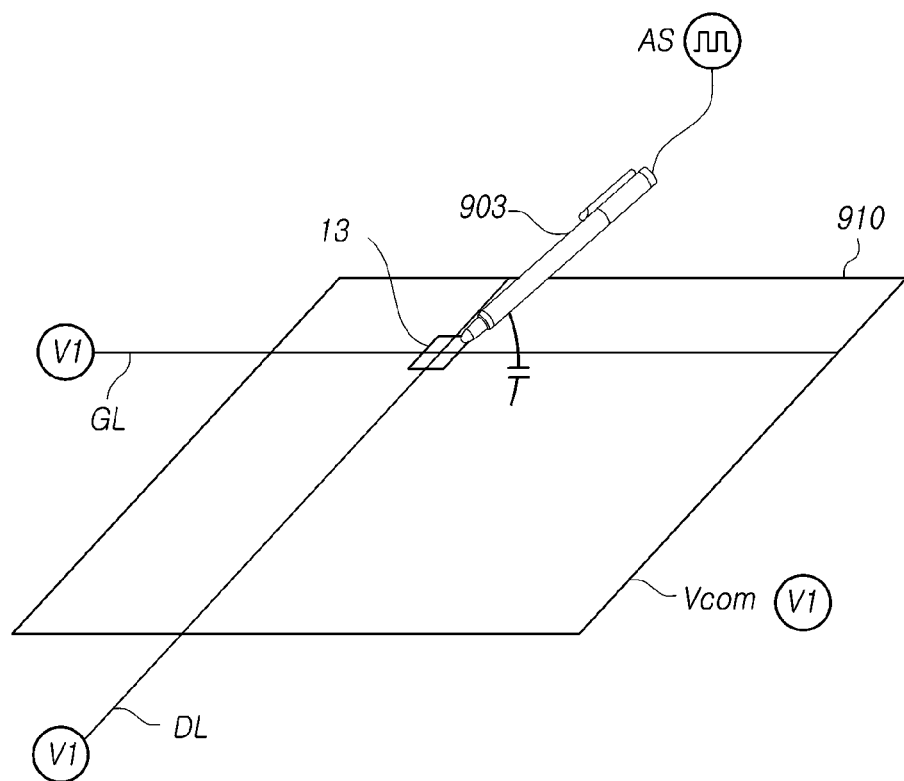
FIG. 9 illustrates a method of sensing a touch in the display panel, according to an aspect of the present disclosure.

FIG. 9 illustrates a method of sensing a touch in the display panel, according to an aspect of the present disclosure.

Referring to FIG. 9, a touch driving signal Td is not transferred to a common electrode Vcom or if transferred, it is transferred to the common electrode Vcom as a DC voltage V1 having a specific voltage level. In addition, a load free driving signal LFD is not transferred to at least one of a gate line GL and a data line DL or if transferred, it is transferred a load free driving signal LFD, having a DC voltage V1 with a specific voltage level, to at least one of the gate line GL and the data line DL. Here, the specific voltage level may be 0V. However, the present disclosure is not limited thereto.

In addition, a touch driving signal Td or an alternating signal AS corresponding to the touch driving signal can be caused by a stylus 903. In this state, when the stylus 903 touches a point B on a display panel 910, a change in capacitance is formed in the common electrode Vcom by the stylus 903. In response to the change in capacitance, a touch sensing signal can be generated.

Figure 10:
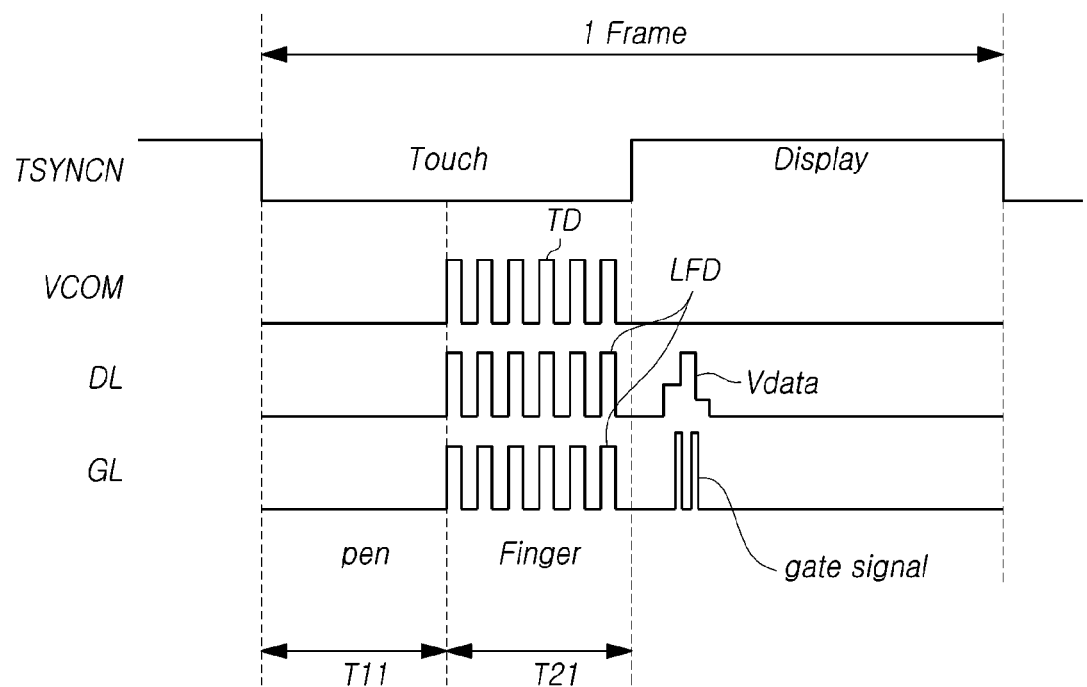
FIG. 10 is a timing diagram of a method of driving the display device illustrated in FIG. 1, according to an aspect of the present disclosure.

FIG. 10 is a timing diagram of a method of driving the display device illustrated in FIG. 1, according to an aspect of the present disclosure.

Referring to FIG. 10, a first frame section/period (1 Frame) for displaying an image is divided into a single touch sensing section/period (which may also be referred to as a Touch period or touch sensing mode) and a single display section/period (which may also be referred to as a Display period or display mode), determined by touch control signal TSYNCN. Accordingly, the display panel can operate in one of a display mode and/or a touch sensing mode.

As is known in the art, a single frame refers to a single instance of driving the display panel of the display device for displaying an image, which depending on the underlying frequency may range from a few times to a few hundred times per second (e.g., at 60 Hz, 120 Hz, 240 Hz, etc.)

The touch sensing mode Touch is divided into a first section T11 and a second section T21. Because the touch sensing mode Touch may also be referred to as a period of time in which the display panel operates in a touch sensing mode, T11 and T21 may also be referred to as a first touch sensing period and a second touch sensing period, respectively. In the first touch sensing period T11, a common electrode Vcom can output a touch sensing signal in response to a touch driving signal transferred via a stylus.

In the first touch sensing period T11, the common electrode Vcom can receive a voltage (a Td signal) in a low state. The low state voltage may be 0V or may be a DC voltage having a desired (and/or alternatively predetermined) level. The low state voltage may be a ground voltage. The transfer of the low state voltage to the common electrode Vcom may mean that the touch driving signal TD is not transferred. Here, the low state voltage can also be transferred to a data line DL and/or a gate line GL. Alternatively, instead of providing the low state voltage (or a signal identical to or corresponding to the signal provided to the common electrode Vcom) to data lines and gate lines, such data lines and gate lines may be floating (e.g., being in an electrically open state). By floating the data lines and/or gate lines, power consumption of the display device 100 may be reduced as there is no need to provide low state voltage for the data lines and/or gate lines and at the same time, an acceptable level of reduction in parasitic capacitance can be achieved.

The low state voltage may be 0V or a DC voltage having a desired (and/or alternatively predetermined) level. The transfer of the low state voltage to the data line DL and the gate line GL may mean that a load free driving LFD voltage is not transferred.

In the second touch sensing period T21, the common electrode Vcom may receive a touch driving signal TD, i.e. an alternating signal in which a high state and a low state are repeated. A load free driving signal LFD transferred to the data line DL and/or the gate line GL and the touch driving signal TD transferred to the common electrode may be synchronous signals that can identical to or correspond to the touch driving signal TD. Alternatively, instead of providing the load free driving signal LFD (or a signal identical to or corresponding to the signal provided to the common electrode Vcom) to data lines and gate lines, such data lines and gate lines may be floating (e.g., being in an electrically open state). As mentioned, by floating the data lines and/or gate lines, power consumption of the display device 100 may be reduced as there is no need to provide LFD for the data lines and/or gate lines and at the same time, an acceptable level of reduction in parasitic capacitance can be achieved.

The synchronous signals may refer to signals having the same phase and frequency. Thus, the voltages of the data line DL and/or the gate line GL have the same frequency and phase as the voltage of the common electrode Vcom, thereby reducing signal distortion.

In the display mode Display, a data voltage Vdata corresponding to a data signal is transferred through the data line DL, and a gate signal is transferred through the gate line GL. Thus, the display panel 110 can display an image corresponding to the data signal.

When a touch control signal TSYNCN is in a low state, the display panel can operate as the touch sensing mode Touch. When the touch control signal TSYNCN is in a high state, the display panel can operate as the display mode Display. The touch control signal TSYNCN may be output by the control circuit 140 illustrated in FIG. 1. In response to the operation of the control circuit 140, the driver IC 120 can output the load free driving signal LFD in the touch sensing mode Touch and can output the data voltage Vdata and the gate signal corresponding to the data signal in the display mode Display.

Figure 11:
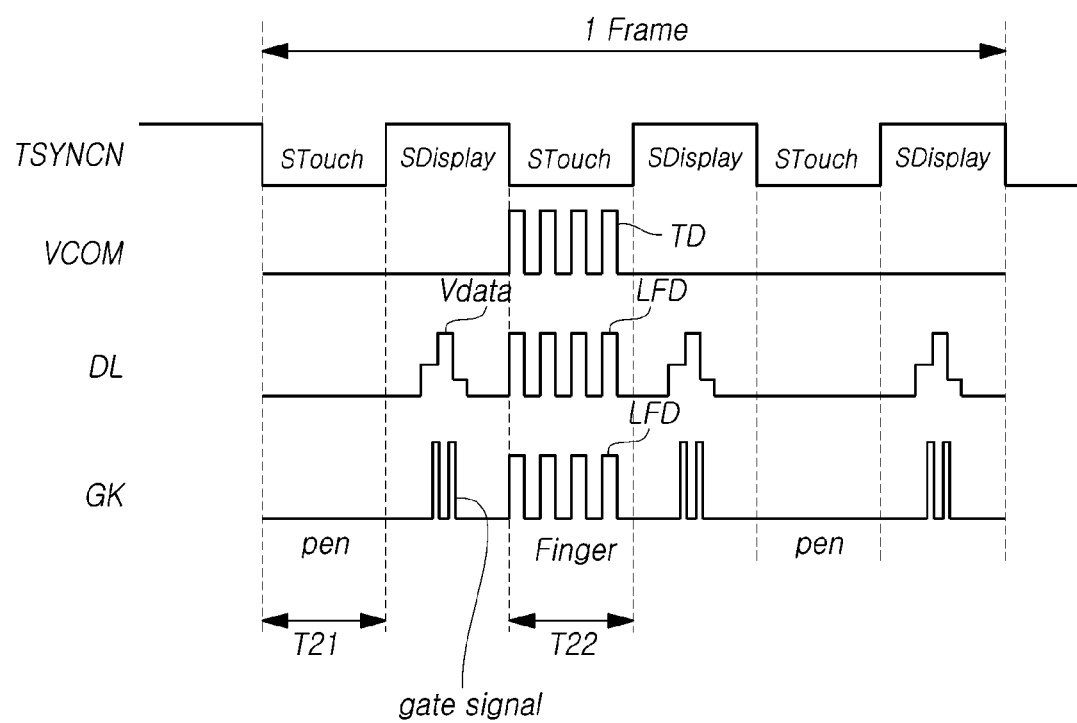
FIG. 11 is a timing diagram of a method of driving the display device illustrated in FIG. 1, according to an aspect of the present disclosure.

FIG. 11 is a timing diagram of a method of driving the display device illustrated in FIG. 1, according to an aspect of the present disclosure.

Referring to FIG. 11, a single frame section (1 Frame) of an image includes a plurality of sub-display modes (sub-display sections) sDispaly and a plurality of sub-touch sensing modes (sub-touch sensing sections) sTouch determined by touch control signal TSYNCN. One sub-touch sensing mode sTouch among the plurality of sub-touch sensing mode sTouch is disposed between one sub-display mode sDispaly and another sub-display mode sDispaly among the plurality of sub-display modes sDispaly. Alternatively, one sub-display mode sDispaly and one sub-touch sensing mode sTouch may be repeated.

After a first touch sensing section T21 is disposed between two sub-display modes sDispaly, a second touch sensing section T22 may be disposed between next two sub-display sections sDispaly, as shown in FIG. 11.

In one example, in each sub-touch sensing mode, a different touch signal is provided to the touch sensors. For example, while in sub-touch sensing mode T21, a DC voltage or a low state voltage is provided to the touch sensors (common electrode Vcom), in the next subsequent sub-touch sensing mode (e.g., T22), a different touch signal such as the touch driving signal TD is provided to the touch sensors. Furthermore, during T21, gate lines and/or data lines (which may collectively be referred to as signal lines) corresponding to the touch sensors are supplied with a voltage identical to or corresponding to the DC voltage provided to the touch sensors (common electrode Vcom). Alternatively, the gate lines and/or the data lines corresponding to the touch sensors may be floating (be in an electrically open state) during T21. As mentioned, by floating the data lines and/or gate lines, power consumption of the display device 100 may be reduced as there is no need to provide DC voltage for the data lines and/or gate lines and at the same time, an acceptable level of reduction in parasitic capacitance can be achieved.

Similarly, during T22, gate lines and/or data lines (which may collectively be referred to as signal lines) corresponding to the touch sensors are supplied with a load free driving signal LFD corresponding to the touch driving signal TD or alternatively, may be floating (be in an electrically open state). As mentioned, by floating the data lines and/or gate lines, power consumption of the display device 100 may be reduced as there is no need to provide LFD for the data lines and/or gate lines and at the same time, an acceptable level of reduction in parasitic capacitance can be achieved.

In addition, a touch driving signal TD and a load free driving LFD signal may be output in each sub-touch sensing mode, while a data signal and a gate signal may be output in each sub-display mode.

When a single display mode is divided into a plurality of sub-display modes in a single frame section, data voltage charging time can be shortened. Consequently, the display panel 110 can provide high resolution images and/or can operate at a high frequency.

Figure 12:
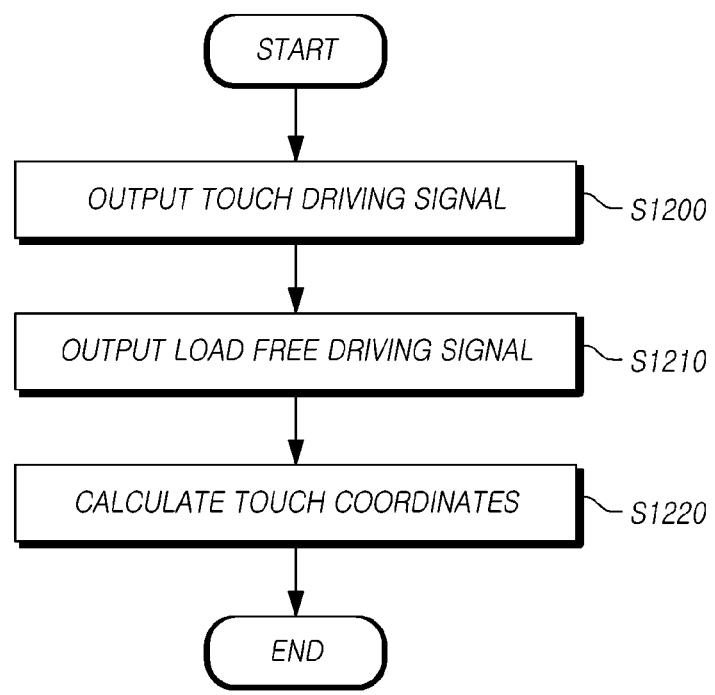
FIG. 12 is a flowchart illustrating a touch sensing method for the display device illustrated in FIG. 1, according to an aspect of the present disclosure.

FIG. 12 is a flowchart illustrating a touch sensing method for the display device illustrated in FIG. 1, according to an aspect of the present disclosure.

Referring to FIG. 12, the touch sensing method can divide a touch sensing mode into a first period and a second period to sense a touch by a stylus in the first period and sense a touch by a finger in the second period. In other words, the method of FIG. 12 can control the display panel of the display device 100 to operate in a touch sensing mode, where the touch sensing mode is divided into a first touch sensing period during which a touch by a stylus is sensed and a second touch sensing period during which a touch by a finger is sensed.

In this regard, first, at S1200, a touch driving signal is output. The touch driving signal Td may be output as a DC voltage having a desired (and/or alternatively predetermined) level in the first touch sensing period while being output as an alternating signal in the second touch sensing period. In addition, in the first touch sensing period, the stylus can generate a touch driving signal or an alternating signal corresponding to the touch driving signal. The first touch sensing period is a period of time in which a touch by a stylus is sensed, while the second touch sensing period is a period of time in which a touch by a finger is sensed. However, the present disclosure is not limited thereto.

When both the finger and the stylus simultaneously touch different points on the display panel 110, a touch driving signal transferred to the touch sensor is delivered by the stylus, so that a touch sensing signal can only be caused (generated) by the stylus contacting the display panel 110. In the second touch sensing period, a touch driving signal is transferred to the touch sensor. Thus, when both the finger and the stylus simultaneously touch different points on the display panel 110, both the point touched by the finger and the point touched by the stylus are subjected to changes in capacitance. However, since the area with which the finger touches the screen is significantly wider than the area with which the stylus touches the screen, a change in capacitance caused by the stylus is negligible and the touch by the finger can be sensed. Accordingly, in a touch driving mode, the touch by the finger can be discriminated from the touch by the stylus.

In addition, at S1210, a load free driving signal in synchronization with the touch driving signal can further be output. The touch sensor may be coupled to at least one of a data line and a gate line on the display panel, thereby distorting the magnitude of a touch sensing signal caused by a touch. When the load free driving signal in synchronization with the touch driving signal is transferred to prevent the distortion, the voltage of at least one of the data line and the gate line can be caused to be the same as the voltage transferred to the touch sensor. This can consequently prevent a potential difference, thereby overcoming the coupling problem.

Afterwards, at S1220, touch coordinates are calculated. The touch coordinates can be calculated by receiving a touch sensing signal in response to the touch driving signal. The touch sensing signal allows the touched point on the display panel to be detected in response to a change in capacitance. Here, the coordinates of the point touched by the stylus can be calculated in response to the touch sensing signal received in the first touch sensing period, while the coordinates of the point touched by the finger can be calculated in response to the touch sensing signal received in the second touch sensing period. However, the present disclosure is not limited thereto. When the display panel is only touched by the stylus in the second touch sensing period, the coordinates of a point touched by the stylus can be calculated.

The term "touch" used herein means not only an action of directly touching a specific point on the display panel but also hovering at a distance close to the display panel at which a change in capacitance is caused.

Although the load free driving signal is illustrated as being output after the touch driving signal in FIG. 12, the present disclosure is not limited thereto. Both the touch driving signal and the load free driving signal may be simultaneously output, or the load free driving signal may be output before the touch driving signal. The term "simultaneous" used herein may not only mean "being at the same time" but also include "substantially close in time."

Figure 13A:
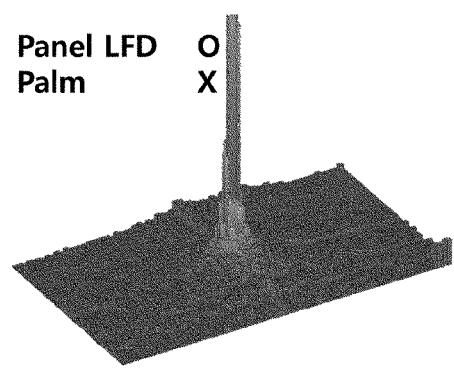
FIG. 13A is a graph illustrating touch sensitivity when the display panel illustrated in FIG. 1 is touched by a stylus, according to an aspect of the present disclosure.
Figure 13B:
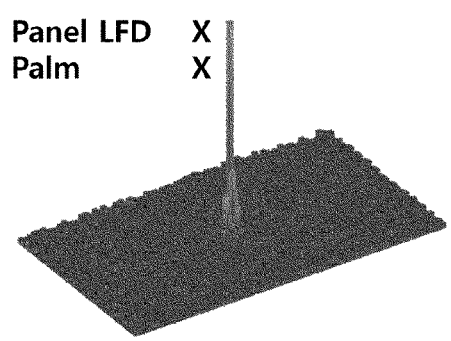
FIG. 13B is a graph illustrating touch sensitivity when the display panel illustrated in FIG. 1 is touched by a stylus, according to an aspect of the present disclosure.
Figure 13C:
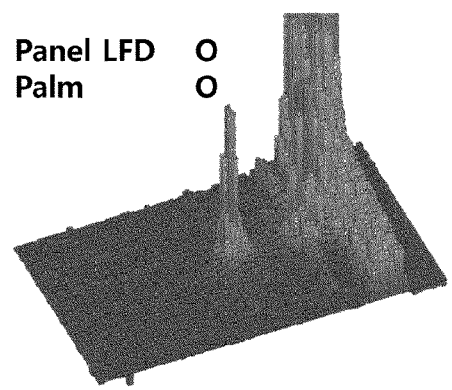
FIG. 13C is a graph illustrating touch sensitivity when the display panel is touched by a stylus and a hand, according to an aspect of the present disclosure.
Figure 13D:
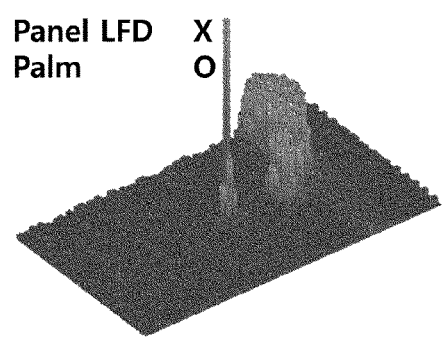
FIG. 13D is a graph illustrating touch sensitivity when the display panel is touched by a stylus and a hand, according to an aspect of the present disclosure.

FIG. 13A is a graph illustrating a touch sensitivity when the display panel illustrated in FIG. 1 is touched by a stylus, according to an aspect of the present disclosure. FIG. 13B is a graph illustrating a touch sensitivity when the display panel illustrated in FIG. 1 is touched by a stylus, according to an aspect of the present disclosure. FIG. 13C is a graph illustrating touch sensitivity when the display panel is touched by a stylus and a hand, according to an aspect of the present disclosure. FIG. 13D is a graph illustrating touch sensitivity when the display panel is touched by a stylus and a hand, according to an aspect of the present disclosure. A higher point on the graph denotes a higher level of touch sensitivity.

FIG. 13A illustrates touch sensitivity when a point on the display panel 110 is touched by a stylus in the state in which a touch driving signal is being provided alternately. In this case, it can be appreciated that a significant amount of capacitance changed at the point touched by the stylus and the surrounding regions are also subjected to a change in capacitance. FIG. 13B illustrates touch sensitivity when a point on the display panel 110 is touched by the stylus in the state in which a touch driving signal is provided as a DC voltage having a desired (and/or alternatively predetermined) level. Here, a touch driving signal or an alternating signal corresponding to the touch driving signal is caused by the stylus. In this case, a touch by the stylus can be sensed, even though a change in capacitance is lower than is illustrated in FIG. 13A.

FIG. 13C illustrates touch sensitivity when the display panel 110 is touched by a stylus and a finger (or palm) in the state in which a touch driving signal is being provided alternately. One point on the display panel 110 is touched by the stylus, while the other point on the display panel 110 is touched by the finger. In this case, the capacitance of the portion touched by the finger is changed by an amount that is more than the capacitance of the portion touched by the stylus. Therefore, the touch by the stylus cannot be sensed due to the touch by the finger. However, as illustrated in FIG. 13D, when points on the display panel 110 is touched by both the finger (or palm) and the stylus in the state in which a touch driving signal is not provided, both a touch by the stylus and a touch by the finger can be sensed. However, a change in capacitance caused by the touch by the finger is significantly smaller than that illustrated in FIG. 13C, so the touch by the stylus can be sensed.

The foregoing descriptions and the accompanying drawings have been presented in order to explain the certain principles of the present disclosure. A person skilled in the art to which the present disclosure relates could make many modifications and variations by combining, dividing, substituting for, or changing the elements without departing from the principle of the present disclosure. The foregoing aspects disclosed herein shall be interpreted as illustrative only but not as limiting of the principle and scope of the present disclosure. It should be understood that the scope of the present disclosure shall be defined by the appended Claims and all of their equivalents fall within the scope of the present disclosure.

What is claimed is:

1. A display device comprising:
   a plurality of electrode patterns overlapped a display area; and
   a plurality of signal lines arranged in the display area;
   wherein a first signal is configured to be applied to the plurality of electrode patterns in a first period, the first signal having a first constant voltage,
   wherein a second signal is configured to be applied to the plurality of electrode patterns in a second period, the second signal having a second constant voltage,
   wherein a third signal is configured to be applied to the plurality of electrode patterns in a third period, the third signal having a first alternating voltage,
   wherein a fourth signal is configured to be applied to the plurality of signal lines in the first period, the fourth signal having a third constant voltage,
   wherein at least one of a gate signal and a data signal is configured to be applied to the plurality of signal lines in the second period,
   wherein a fifth signal is configured to be applied to the plurality of signal lines in the third period, the fifth signal having a second alternating voltage, and
   wherein the first to third periods are time periods included in one frame, and the first to third signals are voltage signals applied to the plurality of electrode patterns, and the fourth and fifth signals are voltage signals applied to the plurality of signal lines.

2. The display device according to claim 1, wherein the first period is a period for sensing a touch by a stylus, and the second period is a period for sensing a touch by a finger.

3. The display device according to claim 1, wherein at least one of the signal lines overlaps with at least one of the plurality of electrode patterns.

4. The display device according to claim 1, wherein the plurality of signal lines includes at least one of gate lines and data lines.

5. The display device according to claim 1, further comprising a first control circuit configured to apply the first signal in the first period, apply the second signal in the second period, and apply the third signal in the third period.

6. The display device according to claim 1, further comprising a second control circuit configured to apply the fourth signal in the first period, apply at least one of the gate signal and the data signal in the second period, and apply the fifth signal in the third period.

7. The display device according to claim 1, wherein a frequency of the third signal in the third period is the same as a frequency of the fifth signal in the third period.

8. The display device according to claim 1, wherein a voltage of the first signal in the first period is the same as a voltage of the second signal in the second period.

9. The display device according to claim 1, wherein the second period is separated from the first period and the third period.

10. A control circuit comprising:
- a first control circuit configured to apply a first signal in a first period, a second signal in a second period and a third signal in a third period; and
- a second control circuit configured to apply a fourth signal in the first period, at least one of a gate signal and a data signal in the second period, and apply a fifth signal in the third period,
- wherein the first signal has a first constant voltage, the second signal has a second constant voltage, the third signal has a first alternating voltage, the fourth signal has a third constant voltage, and the fifth signal has a second alternating voltage, and
- wherein the first to third periods are time periods included in one frame, and the first to third signals are voltage signals applied to a plurality of electrode patterns, and the fourth and fifth signals are voltage signals applied to a plurality of signal lines.

11. The display device according to claim 10, wherein a frequency of the third signal in the third period is the same as a frequency of the fifth signal in the third period.

12. A driving method of display device, comprising:
- supplying, in a first period, a first signal to a plurality of electrode patterns overlapped a display area and a fourth signal to a plurality of signal lines arranged in the display area;
- supplying, in a second period, a second signal to the plurality of electrode patterns and at least one of a gate signal and a data signal to the plurality of signal lines; and
- supplying, in a third period, a third signal to the plurality of electrode patterns and a fifth signal to the plurality of signal lines,
- wherein the first signal has a first constant voltage, the second signal has a second constant voltage, the third signal has a first alternating voltage, the fourth signal has a third constant voltage, and the fifth signal has a second alternating voltage, and
- wherein the first to third periods are time periods included in one frame, and the first to third signals are voltage signals applied to the plurality of electrode patterns, and the fourth and fifth signals are voltage signals applied to the plurality of signal lines.

13. The method according to claim 12, the plurality of signal lines includes at least one of gate lines and data lines.

14. The method according to claim 12, wherein a frequency of the third signal in the third period is the same as a frequency of the fifth signal in the third period.

15. The method according to claim 12, wherein when the first signal is applied to the plurality of electrode patterns in the first period, the display device is configured to receive a pen signal by a stylus.

* * * * *